Nov. 16, 1965   R. T. CASEY   3,218,519

PROTECTIVE DEVICE PANEL ASSEMBLY

Filed Dec. 21, 1962   4 Sheets-Sheet 1

INVENTOR.
Robert T. Casey

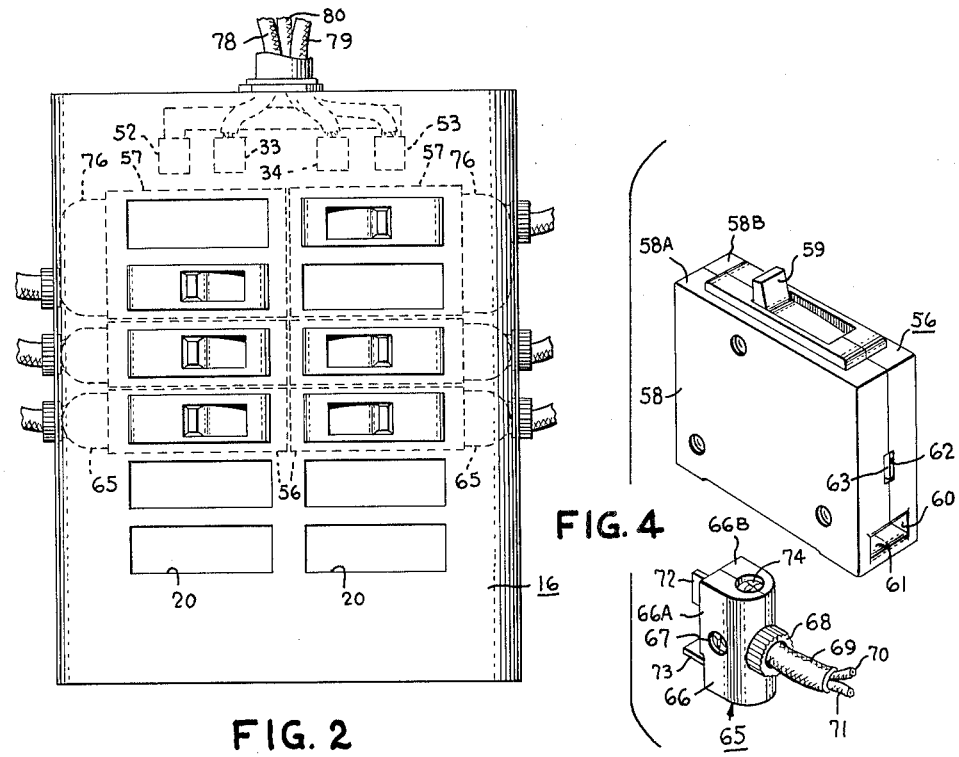
FIG. 2
FIG. 4
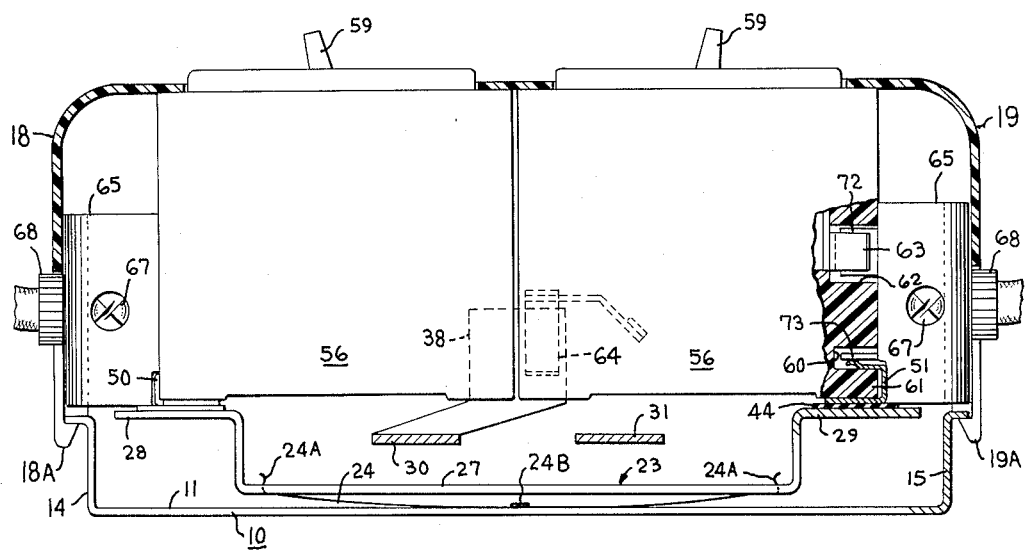
FIG. 3
INVENTOR.
Robert T. Casey

United States Patent Office 3,218,519
Patented Nov. 16, 1965

3,218,519
PROTECTIVE DEVICE PANEL ASSEMBLY
Robert T. Casey, Southington, Conn., assignor to General
Electric Company, a corporation of New York
Filed Dec. 21, 1962, Ser. No. 247,793
6 Claims. (Cl. 317—119)

My invention relates to protective device panel assemblies, and particularly to panel assemblies which are used in residential or similar buildings for the protection and control of branch circuits such as lighting and appliance control circuits.

Panel assemblies of the type described, according to the prior art, commonly include a generally rectangular metallic box or enclosure and a number of circuit control devices, such as circuit breakers or fuse blocks supported within the enclosure, usually on a separate supporitng base. Means is also provided, usually in the form of elongated bus bar conductors for delivering power to each of the circuit control devices. The incoming power cables are connected to the bus bars by suitable means such as by a terminal block within the enclosure. Each lighting or appliance circuit to be supplied is energized by having one line (referred to for convenience as the "outgoing" line) thereof connected directly to a circuit protective device. The other or "return" conductor of each circuit is connected to a "neutral" bar, the neutral bar being connected to a main return or ground conductor. The neutral bar comprises a compact multiple connector means, in one particular location in the enclosure. The pair of conductors of each branch circuit must therefore be separated, one being connected to a protective device in one part of the enclosure, and the other being brought to the neutral bar in another part of the enclosure. The enclosure or box must therefore be large enough to provide space for the pair of conductors of each branch circuit to be brought, respectively, to their proper connection points. The space necessary within the enclosure to provide room for the respective conductors of each circuit to be brought to their proper location is referred to in the trade, and therein for convenience, as "wiring gutter" space. The installation and connection of such a panel assembly, therefore involves a substantial amount of time and labor, and results in a device having a large number of conductors crowded within a limited space. The necessary enclosure is also relatively large compared to the space required for the circuit protective devices themselves, and the expense is accordingly increased.

It is an object of the present invention to provide a circuit protective device panel assembly of the type described which eliminates the need for "wiring gutter" space within the enclosure, thereby reducing the size and expense of such enclosure.

It is a further object of the invention to provide a panel assembly of the type described which does not require the outgoing and return conductors of each branch utilization circuit to be connected to respectively remotely located points in the panel assembly, thereby simplifying the installation and connection procedures.

It is another object of the invention to provide a panel assembly of the type described in which all necessary connections of the branch circuit conductors to the panel may readily be made by plug-in type connection.

It is a further object of the invention to provide means whereby, after initial installation, it is difficult for any user to connect a particular branch circuit to a protective device lower capacity than a predetermined capacity.

Other objects of the invention will in part be set forth, and in part become obvious, from the following detailed description, taken in conjunction with the accompanying drawings.

In accordance with the invention in one form, a circuit protective device panel assembly is provided including a supporting backplate, and an interior pan supported on the backplate and carrying a plurality of circuit protective devices. The supporting pan also carries a plurality of main power conductors or bus bars, together with means for connecting incoming power cables to such bus bars. In addition, the supporting pan carries at least one grounding or neutral strip. Plug-in type connectors are provided for connecting one wire of each branch circuit to a circuit protective device, and the other to the neutral strip, both by plug-in action.

In addition, the enclosure is formed to admit such connectors directly, i.e., without threading the conductors through an opening in the enclosure. The invention will be more fully understood from the following detailed description, and its scope will be pointed out in the appended claims.

In the drawings,

FIGURE 2 is a plan view of the assembly of FIGURE 1;

FIGURE 3 is an end elevation view of the panel assembly of FIGURE 1;

FIGURE 4 is an exploded perspective view showing a circuit breaker and associated plug-in connector used in the panel assembly in accordance with the invention;

Figure 1:
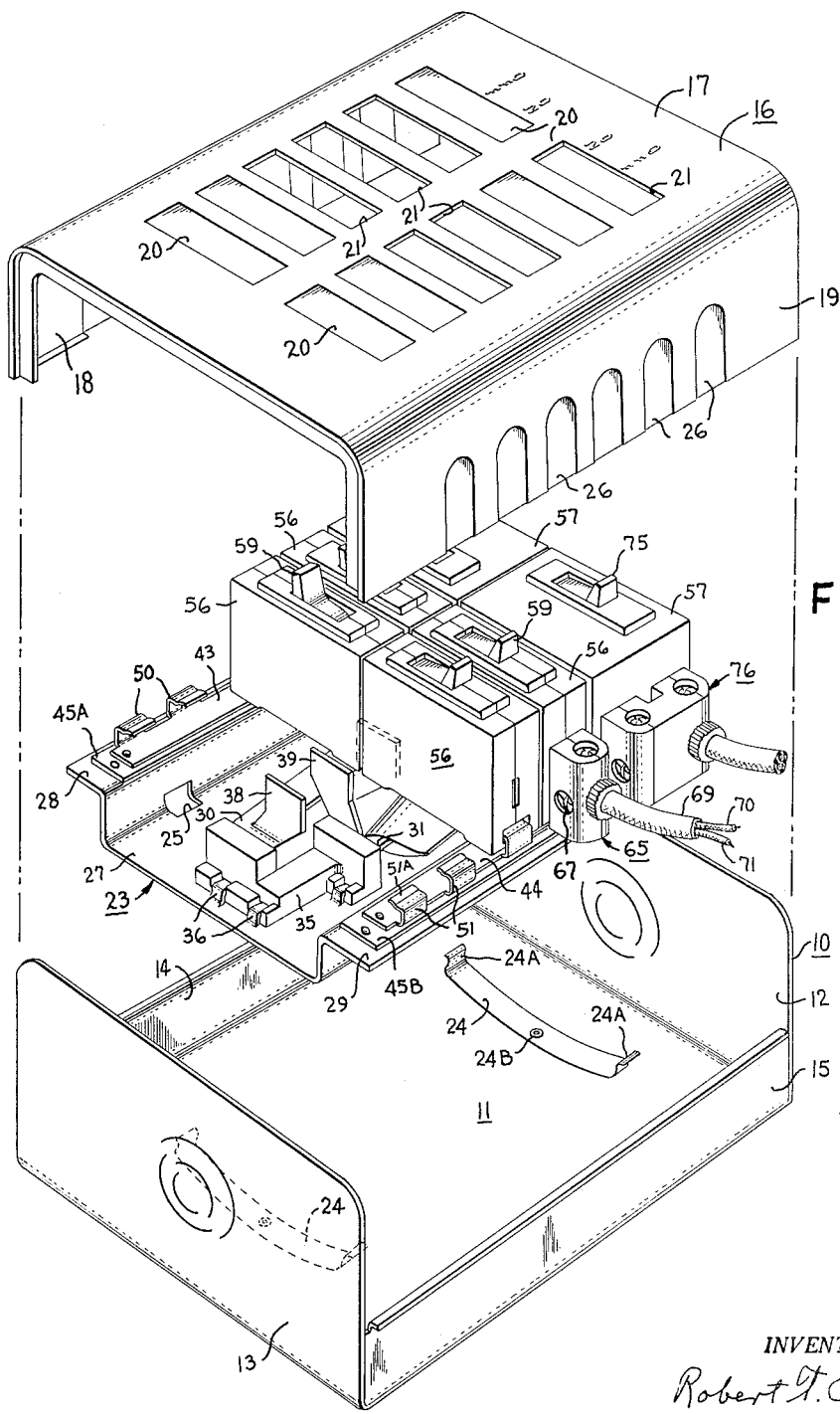
FIGURE 1 is an exploded perspective view of an electric protective device panel assembly incorporating the invention.

In the drawings, the invention is shown as incorporated in an electric protective device panel assembly comprising a two-part enclosure including a generally rectangular base or pan 10 having a back wall 11, opposed end walls 12 and 13 and opposed side walls 14 and 15. The base or pan 10 is adapted to receive a generally U-shaped cover 16 having a top wall 17 and opposed side walls 18 and 19. The top wall 17 of the cover 16 includes a series of generally rectangular frangible portions 20 which are removable to leave rectangular openings 21 for a purpose to be described. The base or pan 10 is preferably formed of metallic material, while the cover 16 may be formed of metallic material or molded plastic insulating material.

A generally U-shaped tray 23 is supported in the base 10 by suitable means, such as by means of resilient spring clips 24. The spring clips 24 are adapted to engage the tray 23 by having their return-bent end portion 24A enter apertures 25 cut in the corners of the pan 23. The clips 24 are mounted on the back wall 11 of the base 10 by suitable means such as by rivets 24B.

The cover 16 also includes elongated frangible or removable knock-out portions 26 in the side walls 18 and 19 respectively. The supporting tray 23 includes a back wall 27 and a pair of outwardly directed flange portions 28 and 29 respectively.

Figure 6:
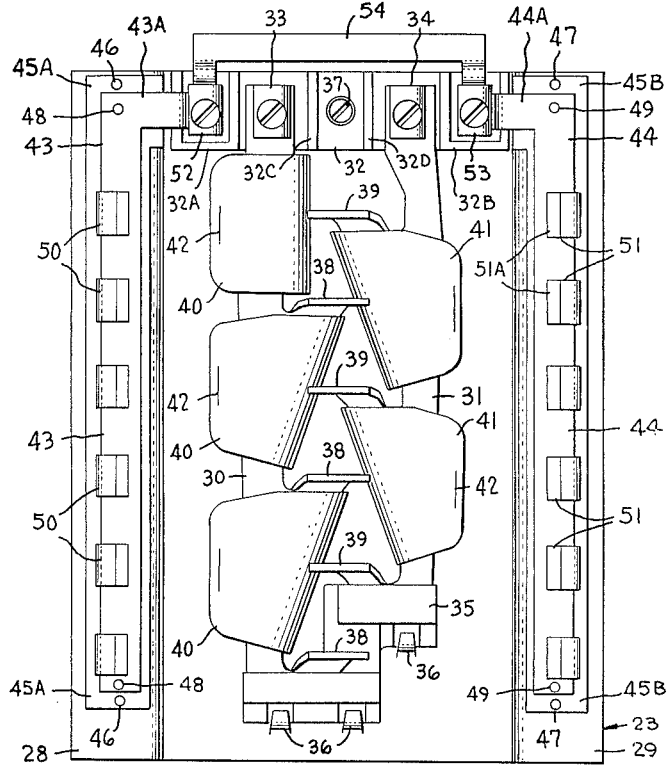
FIGURE 6 is a top plan view of an interior supporting pan of the panel assembly of FIGURE 1.
Figure 7:
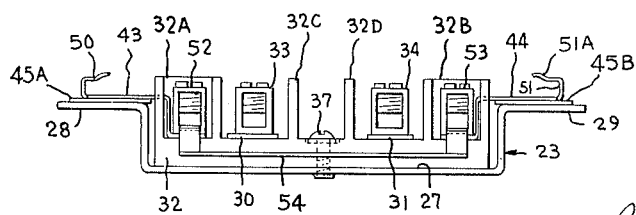
FIGURE 7 is an end elevation view of the pan of FIGURE 6 taken generally on the line 7—7 of FIGURE 6.

Referring now particularly to FIGURES 6 and 7, the interior assembly also includes a pair of electric power conducting bus bars 30 and 31 supported in generally parallel spaced apart relation on the back wall of the tray 23. One end of each of the bus bars 30, 31 is supported on an insulating block 32, being fixedly mounted thereon by suitable means such as by screws, not shown, which are used also to attach electrical terminal connectors 33 and 34 to the ends of the bus bars 30, 31 respectively. The insulating block 32 is mounted rigidly to the tray 23 by means of screw 37. The other end of each of the bus bars 30, 31 is supported by being received in a recess, not shown, in a generally S-shaped insulating block 35, which is trapped in place on the supporting tray 23 by suitable means such as by offset lugs 36.

Each of the bus bars 30, 31, includes a plurality of integral offset upstanding contact blades 38, 39 respectively. The blades 38, 39 are disposed in a row generally centrally of the tray 23 and parallel to the side flanges 28, 29. Intermediate portions of the bus bars 30, 31, are insulated by wrap-around insulators 40, 41, respectively. The insulators 40, 41 are held in place on the bars 30, 31 by suitable fastening means such as by staples 42.

Each of the flanges 28, 29 has mounted thereon a "neutral" or return-conductor strip 43, 44, respectively. The neutral strips 43, 44 are insulated from the flanges 28, 29 by suitable means such as by insulating strips 45A, 45B. The insulating strips 45A, 45B are fastened to the flanges 28, 29 by suitable means such as by rivets 46, 47, respectively. The neutral strips 43, 44 are attached to the insulating strips 45A, 45B by suitable insulating means such as by insulating type plastic rivets 48, 49, respectively.

Each of the neutral strips 43, 44, includes a series of longitudinally spaced return-bent clip or hook portions 50 and 51 respectively.

The neutral strips 43, 44 each includes an offset end extension 43A, 44A which extend under and are connected electrically to generally rectangular electrical connectors 52, 53 respectively. The connectors 52, 53 are connected electrically in common by an elongated generally U-shaped bridging connector 54, which is preferably insulated throughout its major intermediate portion.

The insulating block 32 includes generally U-shaped barrier portions 32A, 32B serving to shield the connectors 52, 53, respectively. The insulating block 32 also includes upstanding barrier portions 32C, 32D which extend between the connectors 33, and 34.

The interior assembly comprising the tray 23, bus bars 30, 31, and retaining and neutral strips 43, 44, is adapted to receive a plurality of plug-in type electrical control devices in plug-in engagement thereon as indicated in FIGURES 1, 2, and 3. These include single-pole devices 56, and two-pole devices 57.

Referring particularly to FIGURE 4, each single pole device 56 includes a generally rectangular insulating casing 58 made up of two cooperating halves 58A, 58B, enclosing a suitable contact operating mechanism, not shown, which is adapted to be operated by a manually engageable operable handle 59. The circuit breaker 56 also includes an aperture or recess 60 providing a ledge or shelf portion 61 to be received under one of the retaining hooks 50, 51, see FIGURE 3.

The circuit breaker 56 also includes an elongated aperture or slot 62 providing access to a plug-in type load terminal connector 63, see FIGURE 3, which comprises the output or load terminal of the circuit breaker 56. The circuit breaker 56 also includes a plug-in type "line" or input terminal 64 at the opposite end of the housing of the enclosure for connection to a corresponding one of the blades 38, 39. Access to the plug-in line terminal 64 is provided by a corner slot in the end wall and back wall of the enclosure 56, not shown.

For the purpose of cooperating with the circuit breaker 56 to deliver power to the conductors of a predetermined branch circuit, a plurality of plug-in type connectors or couplers, are provided as indicated generally at 65 in FIGURE 4. Each connector or coupler 65 includes a two-part insulating body 66 including two halves 66A and 66B held together by suitable means such as by a "one-way" or "non-removable" screw 67. The connector 65 also includes a retaining collar or cup 68, having screw threaded engagements with cooperating semi-circular abutments on the halves 66A, 66B, not shown, and serving to admit a cable 69 having two conductors 70 and 71. The conductors 70, 71 are connected within the body 66 to the prongs 72, 73 respectively by suitable means, not shown. The stab 72 is disposed vertically and is adapted to enter the slot 62, and make contact with the socket 63. The stab or prong 73 is disposed horizontally and adapted to enter the recess 60, and to make resilient electrical engagement with the offset end portion 51A of the return-bent hook portion 50, 51 of the neutral srtip 43, 44. A pair of tightening screws 74, only one shown, are provided for clamping the conductors 70, 71, to the stabs 72, 73.

Figure 8:
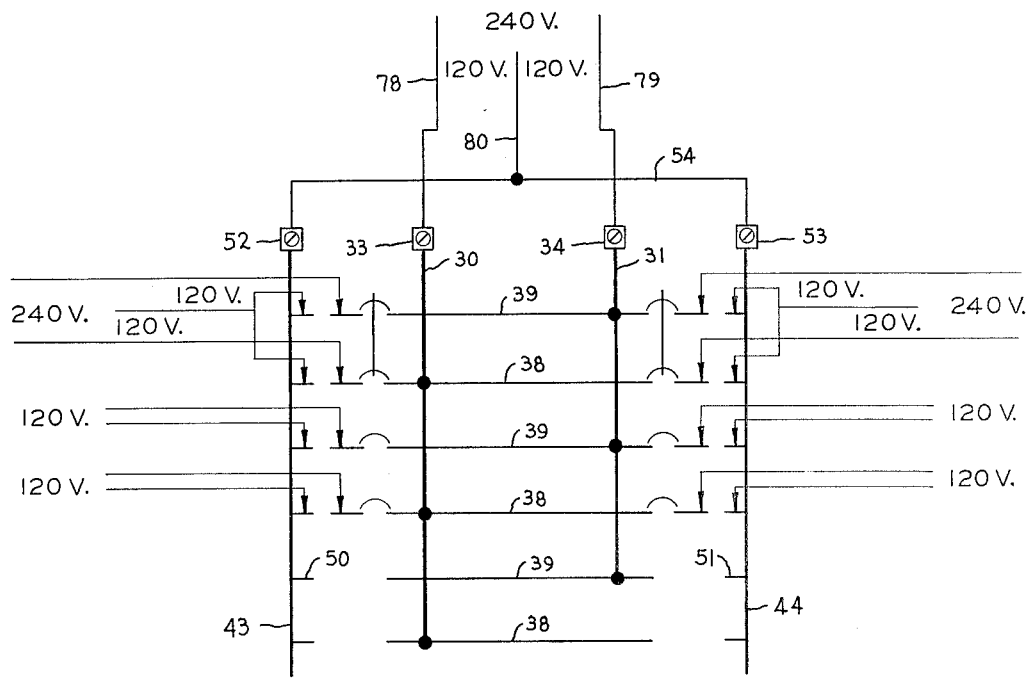
FIGURE 8 is a schematic diagram of the electrical connections of a panel constructed in accordance with the invention.

The two pole circuit breakers 57, see FIGURE 1, each comprise a generally rectangular insulating casing substantially double the width of the casing 66 and each includes two slots corresponding to slots 62 and two recesses corresponding to recess 60 of the circuit breaker 56, although only one handle 75 is provided to operate both units simultaneously. A plug-in type connector or coupler 76 is provided for each two pole circuit breaker 57. Each of the connectors 76 includes two vertically disposed stabs, not shown, corresponding to the stabs 72, but does not include horizontally disposed stabs corresponding to stabs 73. The schematic diagram of the connections described above is given in FIGURE 8.

In use, the tray 23 may be snapped into place in the base 10, and the main power conductor such as conductors 78, 79 connected to the terminals 33, 34, and the neutral conductor 80 connected to one of the terminals 52, 53. The desired circuit breakers 56, 57, are then mounted on the tray 23 by hooking the shelf portions 61 thereof under one of the retaining hooks 50, 51 and then pressing the line terminal 64 into engagement with one of the contact blades 38, 39 as desired. The connections to the outgoing branch conductors are made by first attaching one of the plug-in type connectors such as 65 or 76 to the branch circuit cable in the manner described in connection with FIGURE 4. The connectors 65, 76, are then plugged into engagement with the corresponding circuit breakers 56, 57, thereby making connection both to the selected bus bars, through the medium of the circuit breaker contacts, and also the grounding strip, through the medium of the retaining hooks 50 or 51. The enclosing cover 16, is then prepared by removing the selected knock-out portions 20 and 26 as desired, to provide clearance for the top portions of the circuit breakers and for the connectors 65 and 76. The cover 16 is then placed over the circuit breaker assembly, the lower edges of the side portions 18, 19 being provided with snap-type retaining portions 18A, 19A, which engage outwardly turned ledge portions of the sides 14, 15 of the base 10, see FIGURE 3.

It will now be observed that if it becomes necessary to work on the interior assembly at a later time, this may readily be done by removing the cover 16, and disconnecting the three incoming power cables 78, 79, 80. The entire interior assembly then, comprising the tray 23, the bus bars 30, 31, the circuit breakers 56, 57, and the connectors 65, 76, may be lifted out of the base or box 10 to provide better access. If desired, of course, the connectors or couplers 65 and 76 may be removed to completely free the interior assembly.

In accordance with another aspect of the invention, the connectors 65 and 76 and the circuit breakers 56, 57, have corresponding interengaging portions so dimensioned as to prevent the insertion of a connector of a predetermined capacity with a circuit breaker of a *greater* capacity, thereby insuring against accidental "overfusing" which might defeat the protection intended to the particular circuit.

Figure 5:
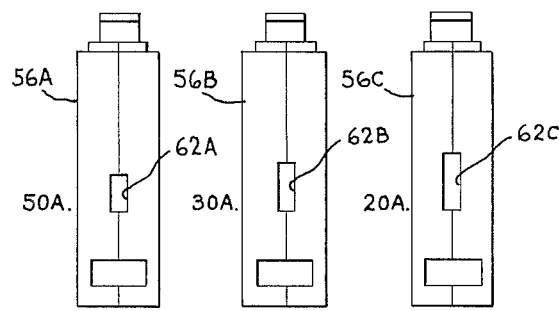
FIGURE 5 is an end elevation view of a series of circuit breakers used in the invention.

For this purpose, as indicated in FIGURE 5, the circuit breakers 56 are provided with contact receiving slots 62A, 62B, 62C, which are of varying height in accordance with the ampere rating capacity of the circuit breaker. Thus the circuit breaker 56A, which is of 50 ampere capacity, for example, has an opening 62A which is of predetermined relatively small size. The circuit breaker 56B, which has a rating of 30 amperes, has an opening 62B of intermediate height, while the circuit breaker 56C, which has a rating of only 20 amperes, has an opening 62C of greater height.

In accordance with the invention, there is provided, to accompany the circuit breaker 56A, a connector which may be called a 50-ampere capacity connector, inasmuch as it is dimensioned to receive and connect onto the end of 50 ampere capacity conductors. Such a connector, may, for example, be constructed as shown and described in connection with FIGURE 4. In any case, such a connector is preferably provided with a clamping means such as the screws 67 and the screws 74, or either of them which are of special "one-way" construction which cannot be removed with the conventional screwdriver but which requires a special tool for removal, which only certain authorized personnel possess. It is therefore impossible or extremely difficult for an unauthorized person to interchange the connectors 65 which have been initially installed by the installing electrician or engineer.

Referring now to FIGURE 5, it will be observed that since a connector with the largest vertically extending portion is provided for use with the circuit breaker 56C, to protect 20 ampere wiring, such a connector cannot be inserted in either of the circuit breakers 56A or 56B, since the openings in these breakers are not large enough to receive it. This assures that only circuit breakers of 20 ampere capacity will be used with conductors of 20 ampere rating. It will be understood that if a branch circuit of 20 ampere capacity were connected to a circuit breaker of 30 ampere capacity, such circuit breaker would no afford adequate protection to the branch conductor, since it would permit current of more than 20 amperes to flow in the branch circuit without tripping the circuit breaker, thereby permitting overheating of the branch circuit and possible fire. At the same time, however, it does no harm to connect a branch circuit of 50 ampere capacity to a 20 or 30 ampere circuit breaker, since such a circuit would then merely be "over-protected." Although the breaker might trip unnecessarily and so cause some inconvenience, there would be no danger of overloading of the circuit such as might cause dangerous heating.

It will likewise be understood that the circuit breakers 57 and the connectors 76 are also preferably provided with openings corresponding to openings 62 of the circuit breakers 56 which are proportioned in respect to the stab connectors of the connector 76 to accomplish the same purpose in the same way.

It will be observed that with the construction provided, none of the branch circuit wiring extends within the enclosure provided by the cover 16 and the base 10. In addition, it is easy to tell by visual inspection which circuit breaker controls which branch circuit. This is impossible with prior art devices, in which the cable connectors enter the box and have a substantial portion bent around within the box. Also, it will be observed that with the assembly provided, the overall space required for a protective device panel assembly is greatly reduced, and the overall size and amount of material required for the enclosure is substantially reduced. Since the branch cable connectors 69 are attached to the connector 65, 76 directly and do not, as such, have to pass through the side wall of the enclosure, it is unnecessary to provide separate bushings for such passageways. Also the danger of short circuit occurring at such points is greatly reduced, since the cable passes through only insulating material in entering the assembly.

It will be apparent that, if desired, the connectors 65 may be made an integral part of the protective devices 56, and such is within the contemplation of the present invention.

While the invention has been shown in only one embodiment, it will be readily apparent that modifications thereof may readily be made. It is therefore intended by the appended claims to cover all such modifications as fall within the true spirit and scope of the invention.

What I claim as new and desire to secure by Letters Patent of the United States is:

1. An electrical protective device panel assembly comprising:
   (a) a support,
   (b) at least two electrical bus bars mounted in spaced apart parallel insulated relation on said support, each of said bus bars having means for connecting a main in-coming power conductor thereto,
   (c) a plurality of electrical device connecting means supported on said support in a row extending parallel to and substantially midway between said bus bars, each of said device connecting means being connected to one of said bus bars,
   (d) a plurality of electrical device retaining means mounted on said support, said retaining means being disposed in two rows extending parallel to and at the outer sides of said bus bars, respectively, each of said retaining means being positioned in alignment with one of said device connecting means and combining therewith to define an electrical device mounting location,
   (e) a plurality of conductor connecting means mounted on said support, each of said conductor connecting means being positioned closely adjacent one of said device mounting locations,
   (f) and means electrically connecting all of said connector connecting means electrically in common and terminal means for connecting a main power conductor to said means connecting all of said conductor connecting means in common.

2. An electrical protective device panel assembly comprising:
   (a) a support,
   (b) at least two electrical bus bars mounted on said support,
   (c) at least two electric cable connecting means mounted on said support and electrically connected to each of said bus bars respectively,
   (d) at least two electrical protective devices supported on said support and each connected to one of said electrical bus bars respectively,
   (e) a first plug-in type electrical connecting means carried by each of said electrical protective devices for receiving an out-going conductor of a power consuming circuit,
   (f) a second plug-in type electrical connecting means carried by said support adjacent each of said first electrical connecting means for making connection to a return conductor of said power consuming circuit,
   (g) means carried by said support connecting all of said second plug-in type electrical connecting means electrically in common, and
   (h) cable connecting means mounted on said support and electrically connected to said means connecting said second plug-in type connecting means in common.

3. An electrical protective device panel assembly comprising:
   (a) a support,
   (b) at least one electrical bus bar mounted on said support,
   (c) electric cable connecting means mounted on said support and electrically connected to said bus bar,
   (d) at least two electrical protective devices supported on said support and electrically connected to said bus bar,
(e) each of said protective devices comprising a generally rectangular insulating casing,
(f) a plug-in type electrical connector carried by said insulating casing adjacent one end thereof for connecting one conductor of a power consuming circuit thereto,
(g) an elongated conductive strip mounted on said support and including generally hook-shaped combination retaining and contacting portions,
(h) said casing of each of said protective devices including a shelf portion adjacent said plug-in connector, said shelf portion being received under a corresponding one of said retaining and contacting portions, whereby electrical connection may be made by plug-in type connecting means to said first plug-in type electrical connector and to said elongated conductive strip by out-going and return conductors of a power consuming circuit respectively, and,
(i) electric cable connecting means supported on said support and electrically connected to said conductive strip.

4. An electrical protective device panel assembly comprising:
(a) a generally rectangular enclosure having a back wall and side walls extending generally perpendicular thereto, said side walls having a plurality of apertures therein,
(b) at least two elongated electrically conductive bus bars supported in said enclosure, a plurality of electrical protective devices supported in said enclosure and each having a first electrical connecting means connected to one of said bus bars,
(c) each of said protective devices having a second electrical connecting means for receiving an outgoing conductor of a branch power-consuming circuit, whereby electric power delivered to said protective device from said bus bar is delivered to said outgoing conductor of said branch power-consuming circuit,
(d) a plurality of third electrical connecting means supported in said enclosure and each disposed adjauent one of said protective devices for receiving a return conductor of said power-consuming circuit,
(e) said second and third electrical connecting means each being located closely adjacent one of said apertures in said side walls to receive said outgoing and said return conductors without any substantial part of said conductors being exposed within said enclosure.

5. An electrical protective device panel assembly comprising:
(a) a generally rectangular enclosure having a back wall and surrounding peripheral upstanding side walls,
(b) at least two elongated conductive bus bars supported in insulated relation in said enclosure,
(c) a plurality of electrical protective devices supported in said enclosure and each connected to at least one of said bus bars,
(d) an elongated neutral conductor strip supported in said enclosure, said neutral conductor strip having a plurality of contact portions linearly spaced therealong and each corresponding in position to the position of a protective device in contact with one of said bus bars,
(e) each of said protective devices having a plug-in type electrical connector,
(f) said plug-in type electrical connectors of said protective devices each being closely adjacent a corresponding contact portion of said neutral strip,
(g) a single electrical connecting device having means for receiving the outgoing and return conductors of a branch power-consuming circuit and said connecting device also having plug-in type electrical connecting means connecting said conductors to said plug-in type electrical connector of one of said protective devices and to the corresponding plug-in type contact portion of said neutral strip simultaneously.

6. An electrical protective device panel assembly comprising:
(a) an enclosure,
(b) at least two elongated conductive bus bars supported in said enclosure,
(c) a plurality of substantially identical electrical protective devices supported in said enclosure and each connected to at least one of said bus bars,
(d) each of said protective devices including a plug-in type load terminal,
(e) an elongated neutral conductor strip supported in said enclosure and including a plurality of contact portions each disposed adjacent a corresponding plug-in type load connector of said protective devices,
(f) a first plug-in type connector having a first plug-in type contact member engaging said plug-in type load terminal of one of said protective devices and a second plug-in type electrical contact member for plug-in contact with a corresponding contact portion of said neutral strip,
(g) at least one of said electrical protective devices including a plug-in type load terminal which is incapable of receiving said first plug-in connector, and
(h) a second plug-in type connector usable with said one circuit breaker and including a first plug-in type contact member for contact with said plug-in type load terminal of said one circuit breaker and a plug-in type contact member for contact with the corresponding contact portion of said neutral strip,
(i) whereby said second plug-in type connector may be used only with said second circuit breaker.

References Cited by the Examiner
UNITED STATES PATENTS

| | | | |
|---|---|---|---|
| 2,337,212 | 12/1943 | Thomson et al. | 200—51 |
| 2,645,725 | 7/1953 | Miller | 317—119 |
| 3,114,904 | 12/1962 | Sliman | 200—51 |

KATHLEEN H. CLAFFY, *Primary Examiner.*

JOHN F. BURNS, *Examiner.*